(12) United States Patent
Chang et al.

(10) Patent No.: US 7,967,026 B2
(45) Date of Patent: Jun. 28, 2011

(54) COUPLING AND DECOUPLING ASSEMBLY OF PIPE HAVING DOUBLE VALVE

(75) Inventors: Seok Kyu Chang, Daejeon (KR); Sang Ki Moon, Daejeon (KR); Seok Cho, Daejeon (KR); Bok Deuk Kim, Daejeon (KR)

(73) Assignees: Korea Atomic Energy Research Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 986 days.

(21) Appl. No.: 11/758,150

(22) Filed: Jun. 5, 2007

(65) Prior Publication Data
US 2008/0001397 A1    Jan. 3, 2008

(30) Foreign Application Priority Data

Jun. 7, 2006  (KR) .................. 10-2006-0051128

(51) Int. Cl.
*F16L 37/367* (2006.01)
(52) U.S. Cl. ........... 137/614.01; 137/614.06; 251/149.2; 251/149.3; 251/149.4
(58) Field of Classification Search .............. 137/614, 137/614.01, 614.02, 614.06; 251/149.2, 251/149.4, 149.3, 149.5; 285/119
See application file for complete search history.

(56) References Cited

U.S. PATENT DOCUMENTS

| 610,035 | A | * | 8/1898 | Edington | 137/614.02 |
|---|---|---|---|---|---|
| 863,027 | A | * | 8/1907 | Gordon | 137/614.02 |
| 867,280 | A | * | 10/1907 | Koehler | 137/614.04 |
| 1,199,024 | A | * | 9/1916 | Wilhelm | 137/614.02 |
| 1,361,126 | A | * | 12/1920 | Wilson | 251/177 |
| 2,326,143 | A | * | 8/1943 | Hufferd | 137/614.01 |
| 2,372,820 | A | * | 4/1945 | Gardes | 137/614 |
| 2,376,803 | A | * | 5/1945 | Mower et al. | 137/614.06 |

(Continued)

FOREIGN PATENT DOCUMENTS

JP        56143894        11/1981

(Continued)

OTHER PUBLICATIONS

Japanese Office Action, dated Mar. 1, 2010 and English translation, for corresponding Japanese Patent Application No. 2007-147582.

*Primary Examiner* — Stephen M Hepperle
*Assistant Examiner* — Craig Price
(74) *Attorney, Agent, or Firm* — McCormick, Paulding & Huber LLP (57) ABSTRACT

A coupling/decoupling assembly of a pipe which can selectively open/close a flow channel of the pipe is provided. In the coupling/decoupling assembly of the pipe, a first valve and a second valve are respectively joined with each end of a first pipe and a second pipe. A first driving axis and a second driving axis are respectively joined with each end of the first valve and the second valve. An outer surface and an inner surface of the first and second valves are formed in a spherical body, and the inner surface of the first valve and the outer surface of the second valve are overlapped with each other to close the flow channel of the pipe, and the inner surface of the first valve and the outer surface of the second valve having an identical radius of a curvature.

26 Claims, 12 Drawing Sheets

U.S. PATENT DOCUMENTS

| | | | | |
|---|---|---|---|---|
| 2,440,946 A | * | 5/1948 | Hansen | 137/614.06 |
| 2,712,454 A | * | 7/1955 | Love | 137/614.01 |
| 2,872,216 A | * | 2/1959 | Kaiser | 251/149.9 |
| 4,335,747 A | * | 6/1982 | Mitsumoto et al. | 137/614.06 |
| 5,083,588 A | * | 1/1992 | Truchet | 137/614.02 |
| 5,488,972 A | * | 2/1996 | McCracken et al. | 137/614.06 |
| 5,507,313 A | * | 4/1996 | LeDevehat | 137/614.05 |
| 6,073,648 A | * | 6/2000 | Watson et al. | 137/375 |

FOREIGN PATENT DOCUMENTS

| | | |
|---|---|---|
| JP | 5712187 | 1/1982 |
| JP | 59194191 | 11/1984 |

* cited by examiner

COUPLING AND DECOUPLING ASSEMBLY OF PIPE HAVING DOUBLE VALVE

CROSS REFERENCE TO RELATED APPLICATION

This application claims the benefit of Korean Patent Application No. 10-2006-0051128, filed on Jun. 7, 2006, in the Korean Intellectual Property Office, the disclosure of which is incorporated herein by reference.

BACKGROUND OF THE INVENTION

1. Field of the Invention

The present invention relates to a coupling/decoupling assembly of a pipe using a spherical shape valve, and more particularly, to a coupling/decoupling assembly of a pipe which can selectively prevent a flow channel when coupling/decoupling the pipe by a valve having a part of a spherical body inside the pipe.

2. Description of Related Art

Pipes in various sizes and types are coupled in all facilities and machine apparatuses, from large-scale industrial facilities such as power plants and petrochemical plants to air conditioners and refrigerators in offices and homes. The pipe transfers various types of fluids such as water, vapor, a refrigerant, and the like depending upon purposes of the machine apparatuses and the facilities.

The pipes may corrode from being used for an extended period of time, and may have a crack or may be broken due to an external impact or a sudden state change of a fluid which flows through inside the pipes.

Conventionally, it has been a problem that the fluid which flows through the pipe is leaked to an outside to cause air pollution and waste of resources when the pipe is repaired or replaced.

In a conventional method, the fluid which flows through the pipe is eliminated when the pipe is decoupled from the facility, or when the pipe is replaced or repaired. After replacing or repairing the pipe, the decoupled pipe is coupled again, and the fluid is flowed through the pipe.

In the conventional method, it takes a great amount of time to replace and repair the pipe, and waste of resources and air pollution may occur when the fluid is leaked out. As an example, when a great amount of oil and liquefied petroleum gas (LPG), which are shipped or stored in a huge vessel or in a huge storage base, are transferred to another vessel or base, the oil and LPG may be leaked out. Also, when a pipe is decoupled from a refrigerator and an air conditioner, a fluid in the refrigerator and air conditioner is required to be eliminated for safety reasons. Also, the eliminated fluid is required to be filled again in the refrigerator and air conditioner when the pipe is coupled again. These operations are complex, and a working speed may be lowered due to the complex operation.

Also, when the fluid is a hot fluid, a burn may occur due to the hot fluid, and when the fluid is a radioactive material, radiation exposure may occur.

Also, a container is required to contain the eliminated fluid, and air pollution may occur when disposing of the fluid.

SUMMARY OF THE INVENTION

An aspect of the present invention provides a coupling/decoupling assembly of a pipe which can prevent air pollution, a disastrous accident, and waste of resources, without eliminating a fluid in the pipe, since valves are coupled with ends of two pipes.

An aspect of the present invention also provides a coupling/decoupling assembly of a pipe which can prevent air pollution and waste of resources without leakage of a fluid due to an excellent sealing performance when the pipe is coupled/decoupled since a curved-surface shaped valve is joined with an inside, and which can improve safety of a worker against a burn and radiation exposure.

An aspect of the present invention also provides a coupling/decoupling assembly of a pipe which has a simple structure, which can be used on a semi-permanent basis, and whose maintenance and repairing is simple.

An aspect of the present invention also provides a coupling/decoupling assembly of a pipe, in which a great amount of oil and liquefied petroleum gas (LPG) being stored in a huge vessel may not leak out when the great amount of oil and LPG are transferred to another place.

An aspect of the present invention also provides a coupling/decoupling assembly of a pipe which can be decoupled without eliminating a refrigerant in the pipe when decoupling the pipe from an apparatus such as a refrigerator or an air conditioner.

According to an aspect of the present invention, there is provided a coupling/decoupling assembly of a pipe including a first pipe, a second pipe, a first valve unit, and a second valve unit.

A first flow channel is formed inside the first pipe, and the second pipe is capable of being coupled/decoupled with the first pipe to form a second flow channel. The first valve unit is joined with an end of the first pipe to selectively open/close the first channel, and the second valve unit is joined with an end of the second pipe to selectively open/close the second channel.

Each of the first and second valve units respectively opens each of the first and second flow channels when the first and second pipes are coupled with each other, and each of the first and second valve units respectively closes the first and second flow channels when the first and second pipes are decoupled from each other.

The first valve unit includes a first valve and a first driving axis. The first valve is a part of a spherical body, and an outer surface of the first valve has a first radius of a curvature. The first driving axis is provided toward a center of the spherical body to be joined with the first valve. The second valve unit includes a second valve and a second driving axis. The second valve is a part of a spherical body, and an outer surface of the second valve has a second radius of a curvature. The second driving axis is provided toward a center of the spherical body to be joined with the second valve, the spherical body including the second radius of the curvature. In this instance, the second radius of the curvature is greater than the first radius of the curvature. An inner surface of the first valve is recessed in a shape of the second radius of the curvature, and an inner surface of the second valve is recessed.

An end of the first pipe is formed in a spherical body, and has a radius of a curvature corresponding to the first outer surface. The first valve is joined with the end of the first pipe to rotate, and thereby is able to make a plane contact. Also, an end of the second pipe is formed in a spherical body, and has a radius of a curvature corresponding to the second outer surface. The second valve is joined with the end of the second pipe to rotate, and thereby is able to make a plane contact.

The coupling/decoupling assembly may have a portion of the protrusion of the second expansion part formed in the spherical body, which has the first radius of the curvature, the first radius of the curvature being formed along a surface where the first valve has passed through while rotating.

Also, a coupling/decoupling assembly of a pipe of the present invention includes: a first pipe; a second pipe capable of being coupled/decoupled with the first pipe; a first valve being joined with the first pipe, and an outer surface of the first valve having a first radius of a curvature; a second valve being joined with the second pipe, and an outer surface of the second pipe having a second radius of a curvature, the second radius of the curvature being greater than the first radius of the curvature; a first driving axis being joined with the first valve, and rotating normal to an outer surface of the first valve; and a second driving axis being joined with the second valve, and rotating normal to an outer surface of the second valve.

Also, a coupling/decoupling assembly of a pipe of the present invention includes: a first pipe having a first contact part, and an end of the first pipe having a first radius of a curvature, the first radius of the curvature being greater than an inside diameter; a second pipe having a second part, and an end of the second pipe having a second radius of a curvature, the second radius of the curvature being greater than the first radius of the curvature; a first valve being joined with the first pipe, and including a first outer surface and a first inner surface, the first outer surface having the first radius of the curvature, and the first inner surface having the second radius of the curvature and being recessed by the second radius of the curvature; a second valve being joined with the second pipe, including a second outer surface and a second inner surface, the second outer surface having the second radius of the curvature, and the second inner surface being recessed; a first driving axis being joined with the first valve to rotate normal to the first outer surface; and a second driving axis being joined with the second valve to rotate normal to an outer surface of the second pipe, and having a control part which provides the second valve with inverse rotation, The control part includes: a protrusion being formed on an outer surface of the second driving axis; a control box encircling a portion of the second driving axis, and having the protrusion; an elastic member being embedded in the control box, and providing a restoration force based on a rotating direction of the second driving axis. Besides the elastic member, a motor or a hydraulic device may be used for the control part.

Through the above configuration, a working time may be reduced since there is no need to eliminate the fluid in the pipe when the pipe is coupled/decoupled, and air pollution, waste of resources, and casualty accident can be prevented since leakage of the fluid can be prevented.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
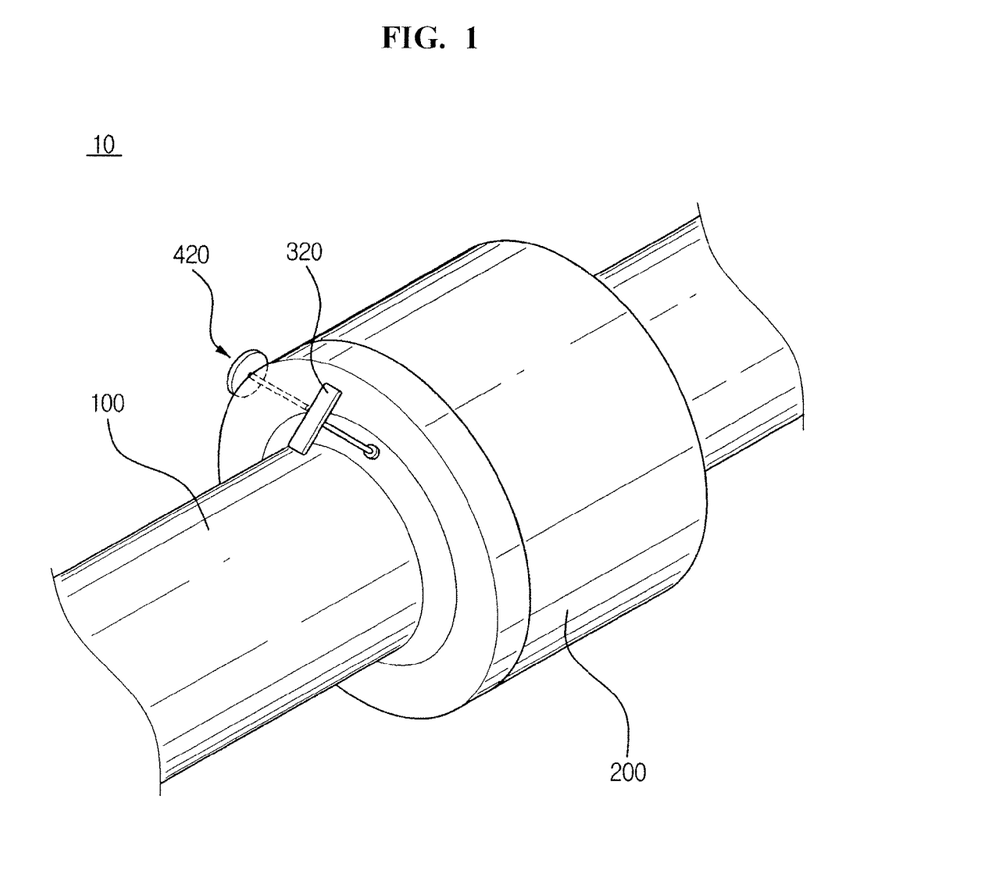
FIG. 1 is a perspective view illustrating a coupling/decoupling assembly of a pipe according to an embodiment of the present invention.
Figure 2:
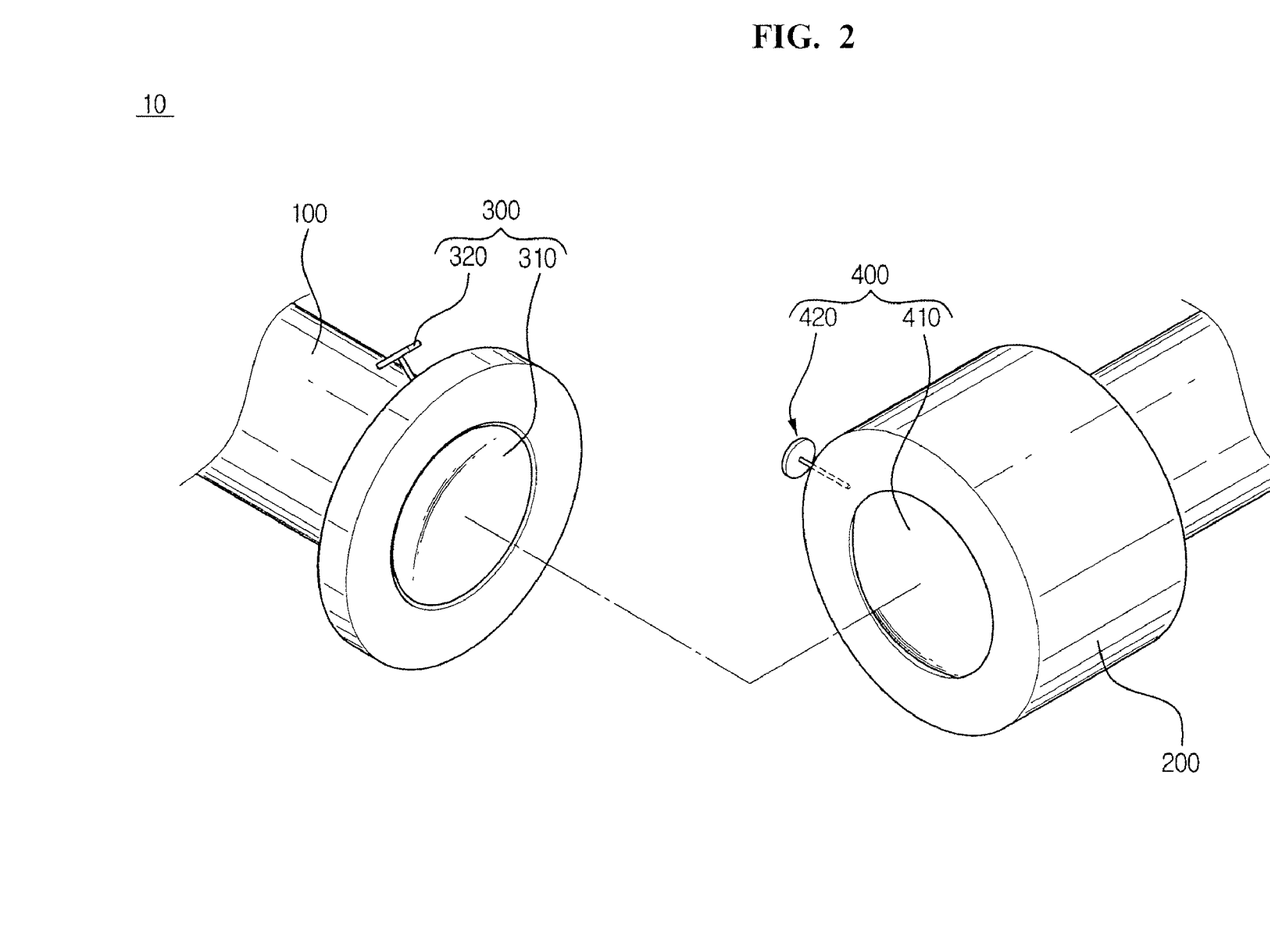
FIG. 2 is a perspective view illustrating separated coupling/decoupling assembly according to an embodiment of the present invention.

FIG. 1 is a perspective view illustrating a coupling/decoupling assembly 10 of a pipe according to an exemplary embodiment of the present invention, and FIG. 2 is a perspective view illustrating a separated coupling/decoupling assembly 10 according to an exemplary embodiment of the present invention.

Figure 3:
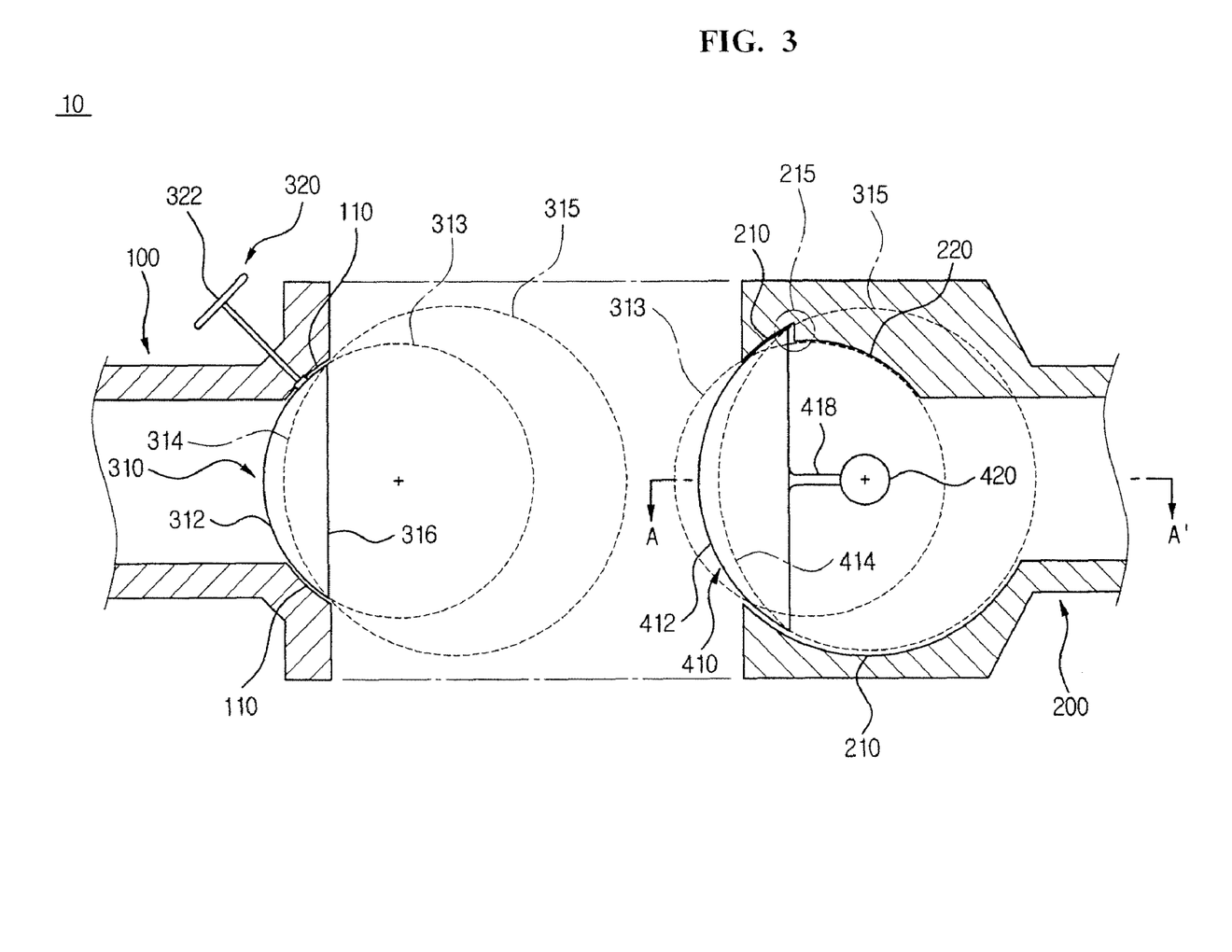
FIG. 3 is a cross-sectional view illustrating an inside of a coupling/decoupling assembly of a pipe according to an embodiment of the present invention.
Figure 4:
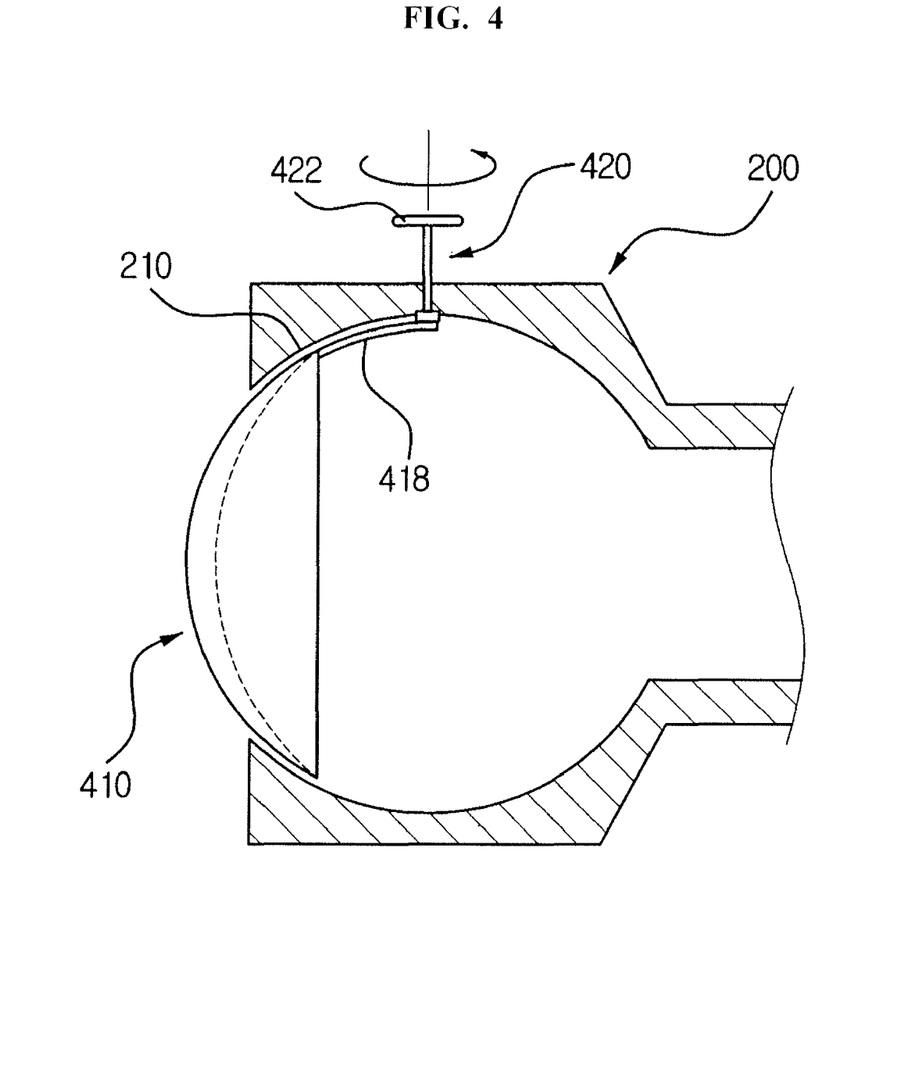
FIG. 4 is a cross-sectional view illustrating the coupling/decoupling assembly of FIG. 3 after cutting along an A-A' line.

As illustrated in FIGS. 2 through 4, the coupling/decoupling assembly 10 includes a first pipe 100 and a second pipe 200, the second pipe 200 being coupled/decoupled with the first pipe 100. Also, the coupling/decoupling assembly 10 includes a first valve unit 300 being joined with the first pipe 100 and a second valve unit 400, the first valve unit 300 being joined with the second pipe 200. The first valve unit 300 includes a first valve 310 being joined to an inside of the first pipe 100 and a first driving axis 320, the first driving axis 320 being joined with the first valve 310 from an outer surface of the first pipe 100 to rotate the first valve 310. A second valve unit 400 includes a second valve 410 being joined to an inside of the second pipe 200 and a second driving axis 420, the second driving axis 420 being joined with the second valve 410 from an outer surface of the second pipe 200 to rotate the second valve 410.

Each of the first valve 310 and the second valve 410 is a part of a spherical body, and is able to effectively prevent a fluid flowing through the first pipe 100 and the second pipe 200 from being leaked to an outside.

Handles for smooth rotation may be respectively provided on a top of the first driving axis 320 and the second driving axis 420. The first driving axis 320 is slantingly joined on an outer surface of the first pipe 100, and the second driving axis 420 is vertically joined on an outer surface of the second pipe 200.

FIG. 3 is a cross-sectional view illustrating an inside of a coupling/decoupling assembly 10 of a pipe according to an embodiment of the present invention, and FIG. 4 is a cross-sectional view illustrating the coupling/decoupling assembly of FIG. 3 after cutting an A-A' line.

As illustrated in FIGS. 3 and 4, the coupling/decoupling assembly 10 includes a first pipe 100 and a second pipe 200, which are capable of being coupled/decoupled with each other, a first valve 310 and a second valve 410, which are capable of selectively preventing a fluid from flowing through the first pipe 100 and the second pipe 200, a first driving axis 320, and a second driving axis 420.

The first valve 310 is formed in a part of a spherical body, and is joined on a side of an inner surface of the first pipe 100. A first outer surface 312 of the first valve 310 has a first radius of a curvature, and a first inner surface 314 of the first valve 310 has a second radius of a curvature, the second radius of the curvature being greater than the first radius of the curvature. A first spherical surface 313 and a second spherical surface 315 are illustrated as dotted lines, each of the first spherical surface 313 and the second spherical surface 315 is configured in the first radius of the curvature and the second radius of the curvature. In the first valve 310, the first spherical surface 313 and the second spherical surface 315 are crossed with each other to form a first border 316. When the first valve 310 is open, the first border 316 is not protruded from an inside of the first pipe 100, and the fluid flows smoothly. The second valve 410 is formed in a part of a spherical body, and is coupled on a side of an inside of the second pipe 200. A second outer surface 412 of the second valve 410 has the identical second radius of the curvature to the first inner surface 314. To reduce the weight of the second valve 410, the second inner surface 414 may be recessed by a predetermined depth, and may particularly be recessed with a predetermined radius of a curvature.

The first pipe 100 is in the shape of a hollow cylinder, in order to permit a fluid to flow therethrough, and an end of the first pipe 100 is expanded in a spherical body shape, which has the first radius of the curvature, to form a first expansion part 110. The second pipe 200 is also in the shape of a hollow cylinder, and has an identical diameter to the first pipe 100. An end of the second pipe 200 is expanded in a spherical body shape, which has the second radius of the curvature, to form a second expansion part 210. To enable a fluid to smoothly flow through the second pipe 200, a second border 416 of the second valve 410 may be formed with an inside of the second pipe 200 in parallel when the second valve 410 rotates to make a plane contact with the second expansion part 210, that is, when a flow channel of the second pipe 200 is open. A protrusion 215 is formed on a side of the second expansion part 210. A third expansion part 220 is formed from the protrusion 215 toward the inside of the second pipe 200, and the third expansion part 220 has the first radius of the curvature. That is, the inside of the second pipe 200 is expanded in correspondence to the first spherical surface 313 to receive the first outer surface 312. The protrusion 215 controls rotation of the second valve 410. A housing of the first pipe 100 and a housing of the second pipes 200 are contacted with each other, and coupled with each other using a general coupling device such as a bolt, a nut, and a coupling. To maintain an airtight seal of the contacted plane, a gasket or O-ring may be used to seal a gap of the contacted plane.

The first driving axis 320 is a type of a stick, and is joined with the first valve 310 to rotate based on a normal of the first outer surface 312. A first handle 322 for rotation is formed on a top of the first driving axis 320. A rotation center of the first driving axis 320 is coupled toward a center of the first spherical surface 313. The first driving axis 320 rotates the first valve 310 by 90 degrees, based on a normal of a contact point of the first valve 310 with first driving axis 320. The second driving axis 420 is a type of a stick, joined with the second valve 410, and rotating based on a normal of the second outer surface 412 of the second valve 410. A second handle 422 for rotation is formed on a top of the second driving axis 420. A rotation center of the second driving axis 420 is coupled towards a center of the second spherical surface 315. In the second valve 410, a connection part 418 is expansively formed along the second expansion part 210. An end of the connection part 418 is expanded to couple with the second driving axis 420, and transmits rotation of the second driving axis 420 to the second valve 410. The thickness and the width of the connection part 418 may be variously selected by considering the operational load and material strength of the second driving axis 420.

Figure 5:
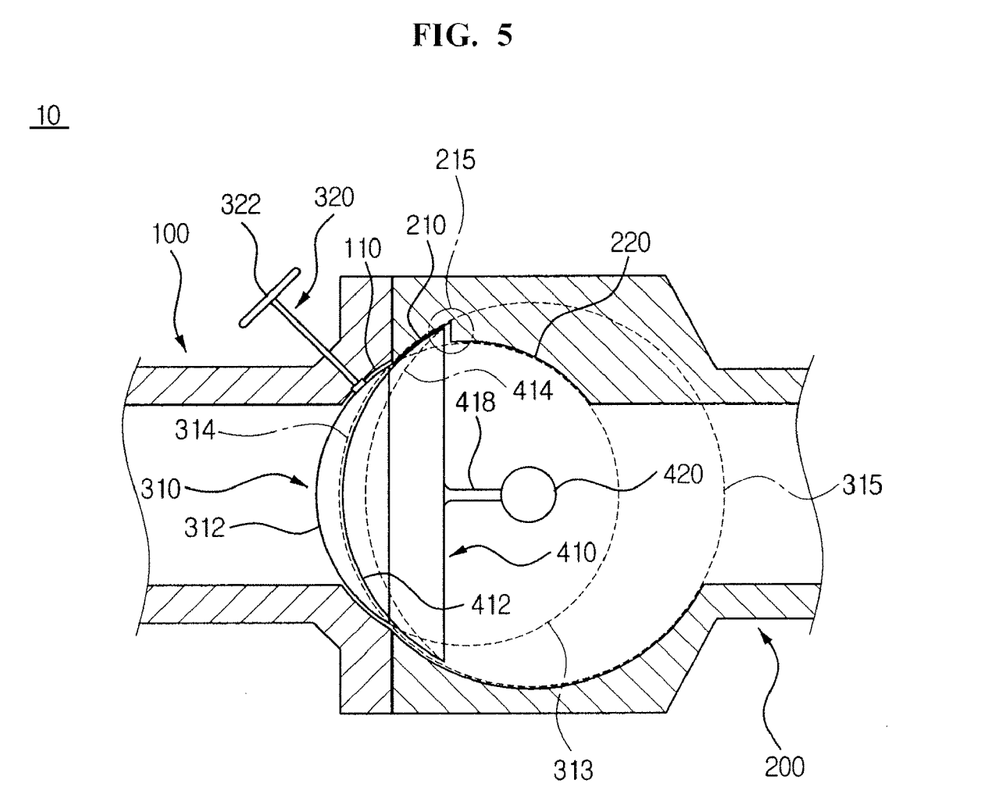
FIG. 5 is a cross-sectional view illustrating an inside of a closed coupling/decoupling assembly of a pipe according to an embodiment of the present invention.
Figure 6:
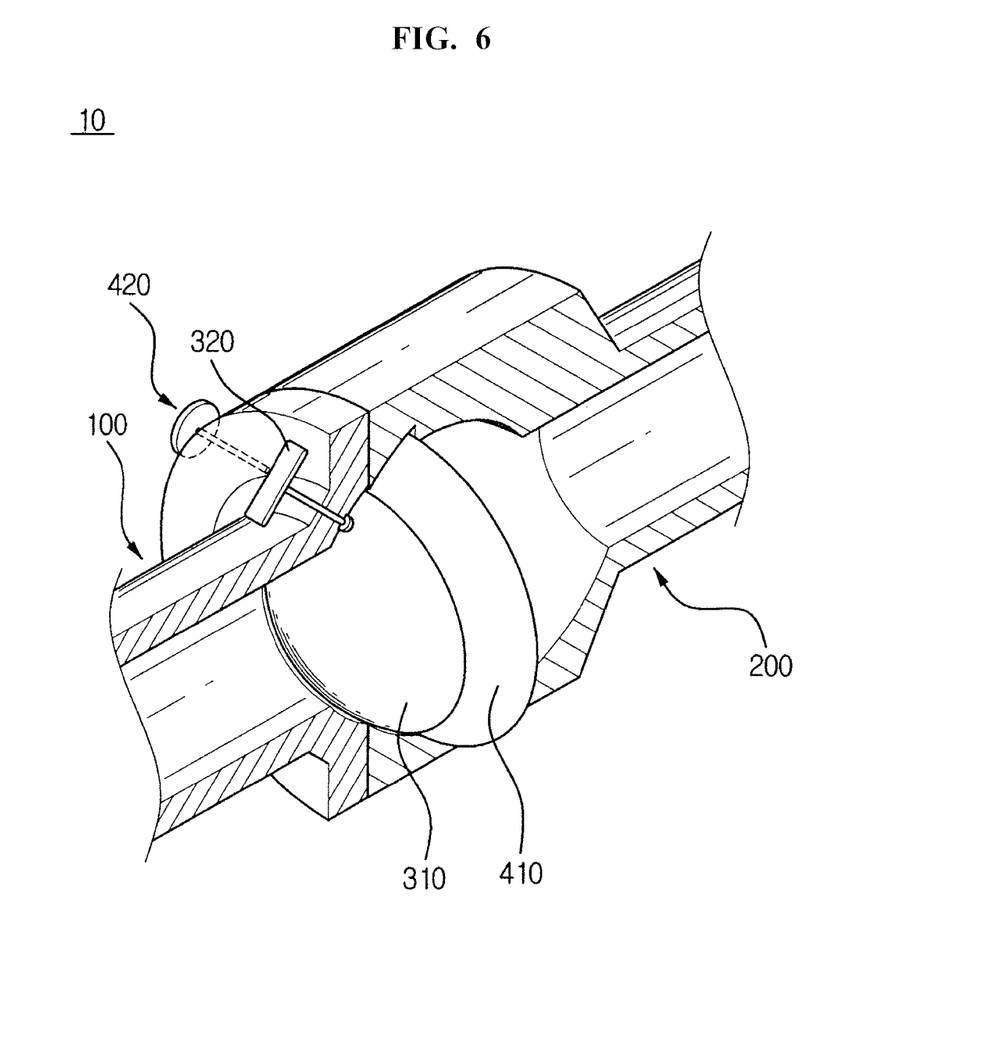
FIG. 6 is a partial cross-sectional view illustrating an inside of a closed coupling/decoupling assembly of a pipe according to an embodiment of the present invention.

FIG. 5 is a cross-sectional view illustrating an inside of a closed coupling/decoupling assembly of a pipe according to an exemplary embodiment of the present invention, and FIG. 6 is a partial cross-sectional view illustrating an inside of a closed coupling/decoupling assembly of a pipe according to an exemplary embodiment of the present invention.

As illustrated in FIGS. 5 and 6, a first valve 310 is coupled on an inside of a first pipe 100. A first outer surface 312 of the first valve 310 makes a plane contact with a first expansion part 110, and thereby prevents a fluid from flowing through the first pipe 100. Since a second outer surface 412 has an identical radius of a curvature to a first inner surface 314, the second outer surface 412 and the first inner surface 314 make contact with each other without a gap. While the plane contact between the second outer surface 412 and the first inner surface 314 is made, a gap between them may be provided to reduce frictional force between the surfaces. To provide the gap, the radius of the curvature of the second outer surface 412 and the first inner surface 314 may be designed to be slightly different, or the coupling point between the first valve 310 and the second valve 410 may be changed. In this instance, a coating agent may be used to seal the gap, in order to prevent a fluid from being leaked to an outside.

Figure 7:
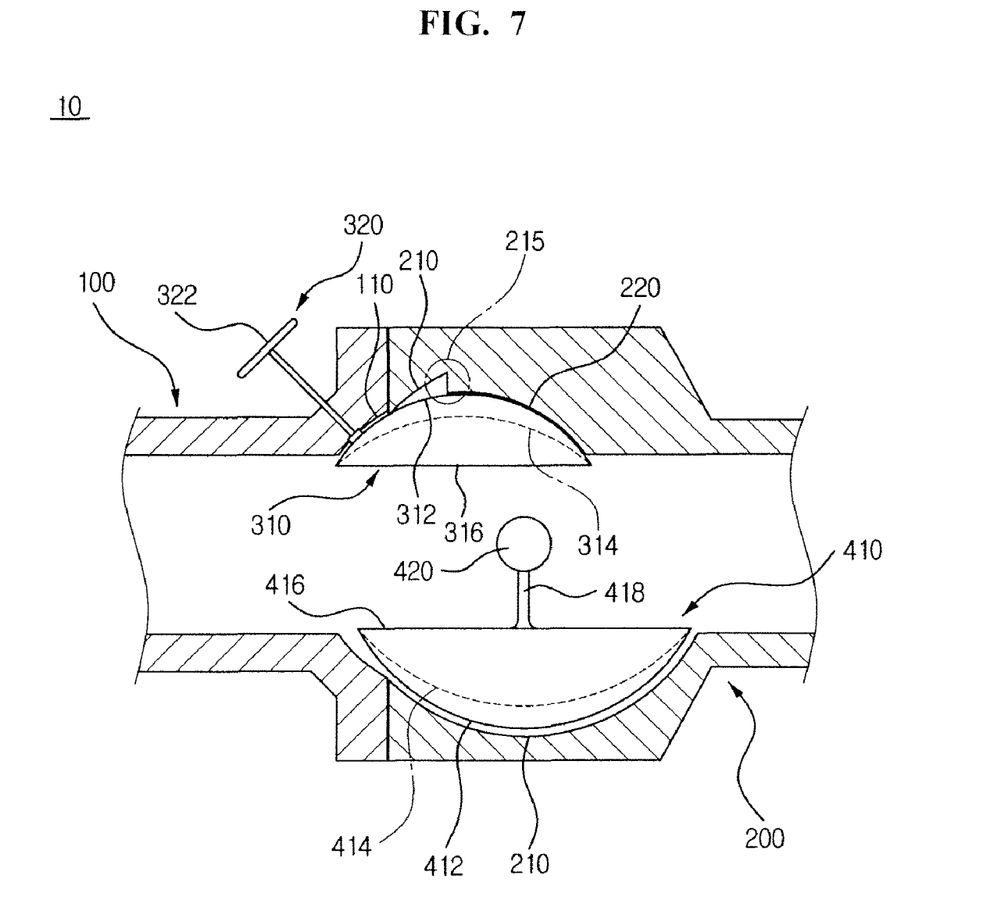
FIG. 7 is a cross-sectional view illustrating an inside of an opened coupling/decoupling assembly of a pipe according to an embodiment of the present invention.
Figure 8:
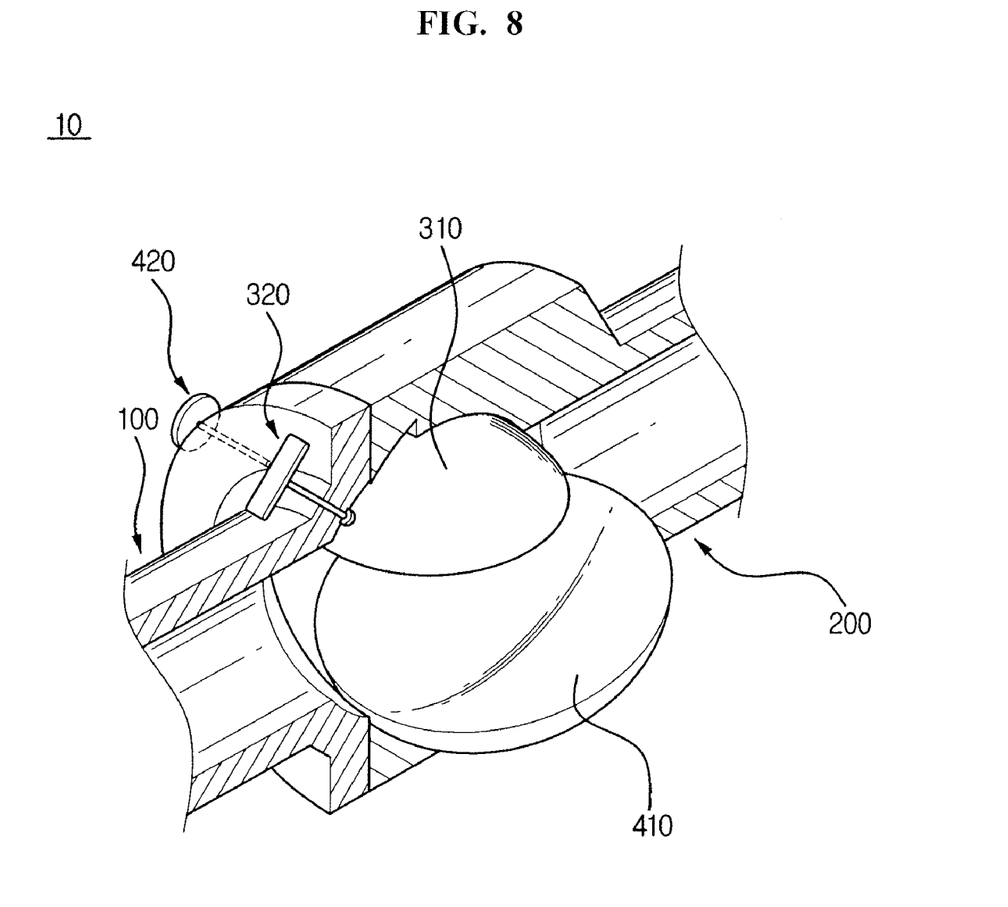
FIG. 8 is a partial cross-sectional view illustrating an inside of an opened coupling/decoupling assembly of a pipe according to an embodiment of the present invention.

FIG. 7 is a cross-sectional view illustrating an inside of an opened coupling/decoupling assembly of a pipe according to an exemplary embodiment of the present invention, and FIG. 8 is a partial cross-sectional view illustrating an inside of an opened coupling/decoupling assembly of a pipe according to an exemplary embodiment of the present invention.

As illustrated in FIGS. 7 and 8, a first valve 310 is connected with a first pipe 100, and a first outer surface 312 of the first valve 310 is contacted to the insides of the first pipe 100 and the second pipe 200. Specifically, the first outer surface 312 is contacted ranging from a first expansion part 110 of the first pipe 100 to a second expansion part 210 of the second valve 410. The second valve 410 is connected with the second pipe 200, and a second outer surface 412 of the second valve 410 is contacted to an inside of the second pipe 200, that is, the second expansion part 210. In this instance, a first border 313 and a second border 315 (shown in FIG. 5) are parallel with insides of the first pipe 100 and the second pipe 200. Accordingly, the first valve 310 and the second valve 410 are open, and thus a fluid may smoothly flow through the first and second pipes 100 and 200. As described above, since each of the first outer surface 312, the second outer surface 412, and the second expansion part 210 has an identical radius of a curvature, there is no gap in a contacted plane between the first outer surface 312 and the second expansion part 210, and in a contacted plane between the second outer surface 412 and the second expansion part 210. However, the gap between the first outer surface 312 and the second expansion part 210, and between the second outer surface 412 and the second expansion part 210 may be provided to reduce a frictional force occurred during the plane contact. In this instance, a coating agent may be used to seal the gap to prevent a fluid from being leaked to an outside.

Figure 9:
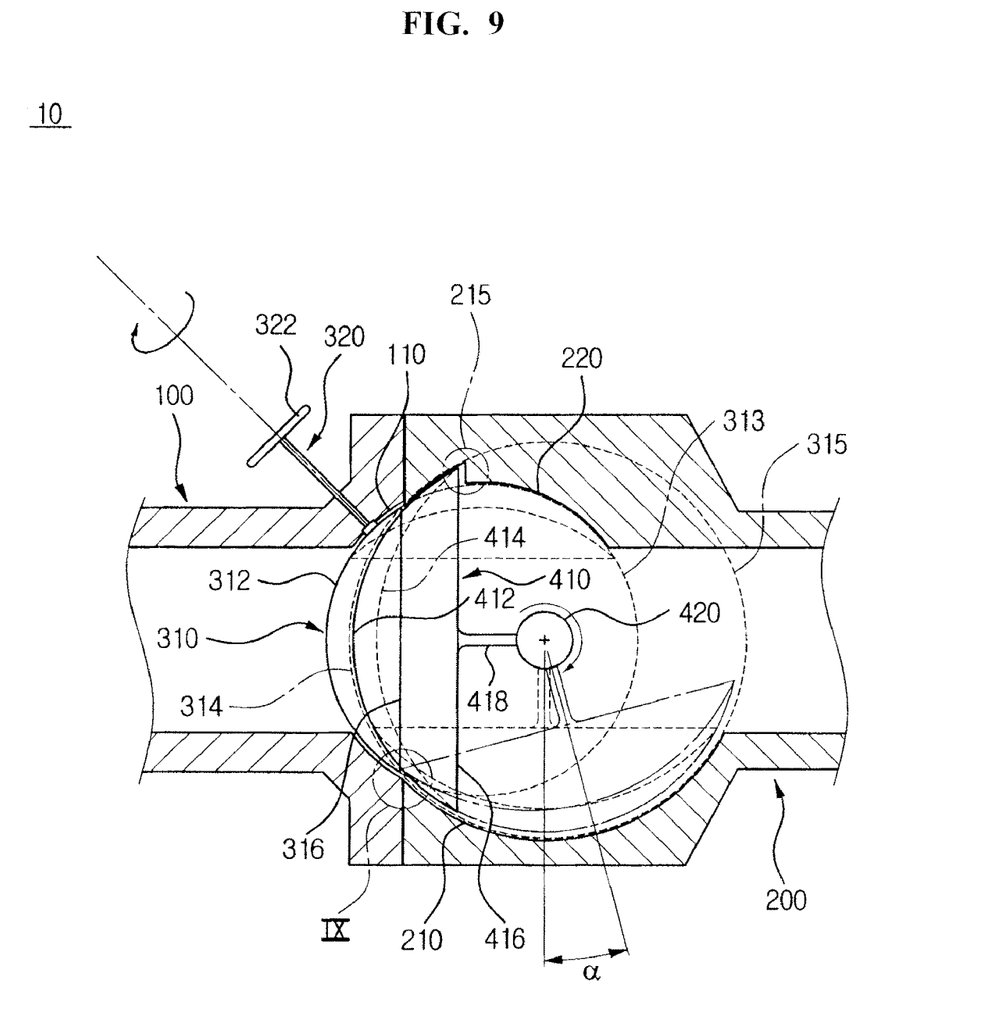
FIG. 9 is a cross-sectional view illustrating an inside of a coupling/decoupling assembly of a pipe being changed from an open state to a closed state.

FIG. 9 is a cross-sectional view illustrating an inside of a coupling/decoupling assembly of a pipe being changed from an open state to a closed state.

As illustrated in FIG. 9, a first valve 310 and a second valve 410 are closed to decouple a first pipe 100 from a second pipe 200. First, the second valve 410 is receded by a predetermined angle α by rotating a second driving axis 420 in a counterclockwise direction to avoid an interference area IX, the interference area IX corresponding to an area where the first valve 310 and the second valve 410 are contacted with each other. Next, the first driving axis 320 is rotated by 90 degrees in a clockwise direction, the first valve 310 is contacted to a first expansion part 110, and a flow channel of the first pipe 100 is closed. In this instance, the first valve 310 rotates along a part of a first spherical surface 313. Next, the second driving axis 420 is rotated in a clockwise direction, and the second valve 410 is rotated until a second border 416 is contacted to a protrusion 215. In this instance, the second valve 410 rotates along a part of a second spherical surface 315. The rotating second valve 410 is stopped by the protrusion 215, and a second outer surface 412 of the second valve 410 is contacted to a first inner surface 314 of the first valve 310. Accordingly, flow channels of the first and second pipes 100 and 200 are securely closed by the first and second valves 310 and 410, and a fluid is not leaked to an outside when decoupling the first and second pipes 100 and 200.

Figure 10:
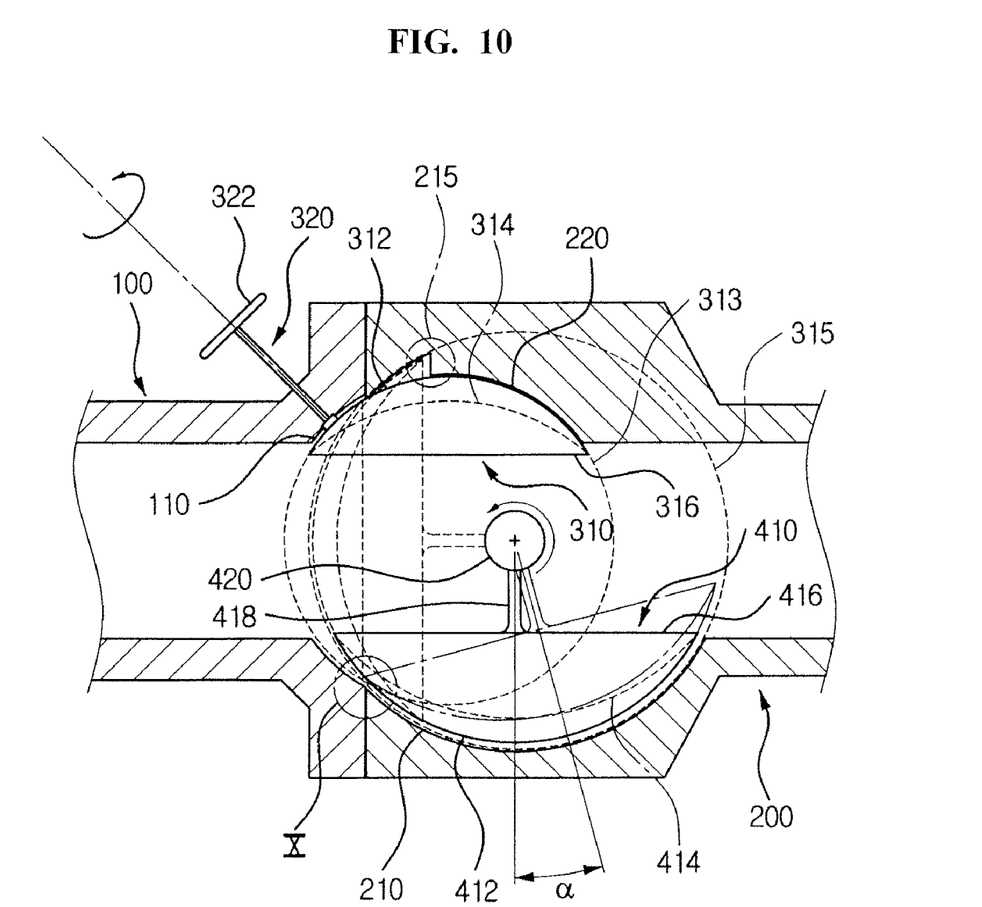
FIG. 10 is a cross-sectional view illustrating an inside of a coupling/decoupling assembly of a pipe being changed from a closed state to an open state.

FIG. 10 is a cross-sectional view illustrating an inside of a coupling/decoupling assembly of a pipe being changed from a closed state to an open state.

As illustrated in FIG. 10, after a first pipe 100 and a second pipe 200 are coupled with each other, a first valve 310 and a second valve 410 are open.

First, a second driving axis 420 is rotated by 90 degrees in a counterclockwise direction, and is rotated by a predetermined angle α to avoid an interference area X, the interference area X corresponding to an area where the first valve 310 and the second valve 410 are contacted with each other. In this instance, a second outer surface 412 rotates in a counterclockwise direction along a part of a second spherical surface 315. Next, the first driving axis 320 is rotated by 90 degrees in a counterclockwise direction. A first border 316 of the rotated first valve 310 is parallel with insides of the first and second pipes 100 and 200. Next, the second driving axis 420 is rotated by a predetermined angle in a clockwise direction, and a second border 416 of the second valve 410 becomes parallel with insides of the first and second valves 310 and 410. Accordingly, flow channels of the first and second pipes 100 and 200 are open, and a fluid may be flow through the first and second pipes 100 and 200.

Figure 11:
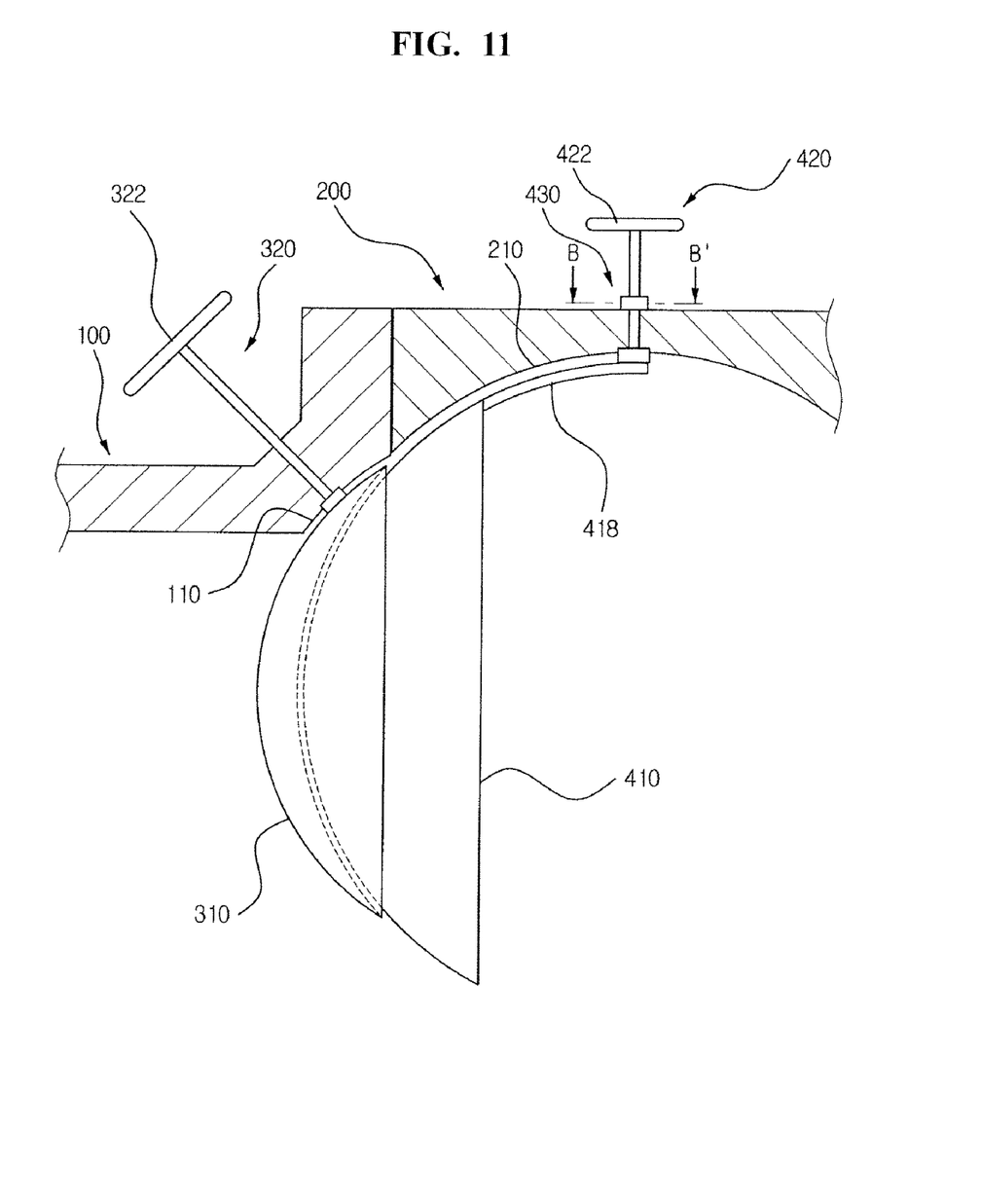
FIG. 11 is a cross-sectional view illustrating an inside of a control part which controls rotation of a second driving axis according to another embodiment of the present invention.
Figure 12:
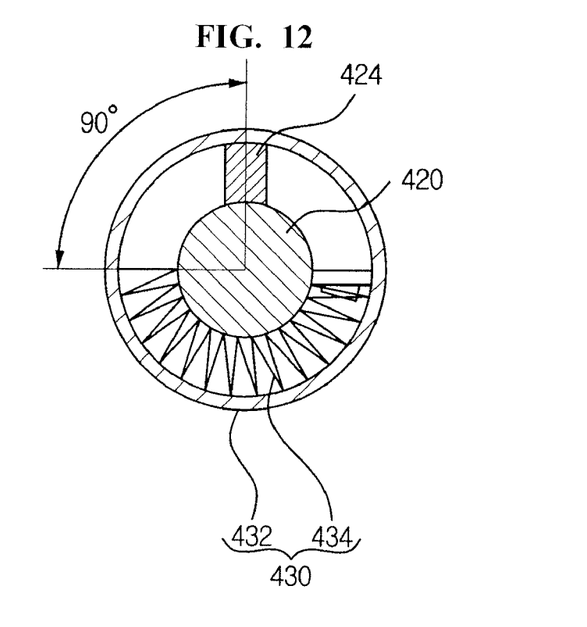
FIG. 12 is a cross-sectional view illustrating an inside of a control part of FIG. 11 after cutting along a B-B' line.
Figure 13:
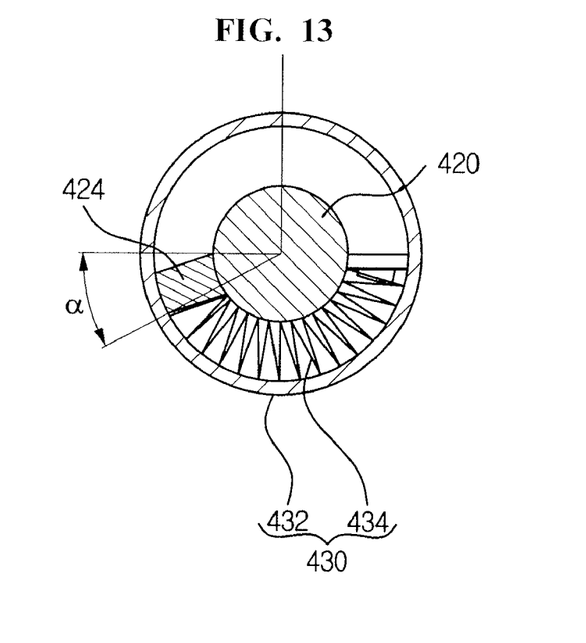
FIG. 13 is a cross-sectional view illustrating that a second driving axis is rotated by a predetermined angle.

FIG. 11 is a cross-sectional view illustrating an inside of a control part which controls rotation of a second driving axis according to another embodiment of the present invention, FIG. 12 is a cross-sectional view illustrating an inside of a control part of FIG. 11 after cutting a B-B' line, and FIG. 13 is a cross-sectional view illustrating that a second driving axis is rotated by a predetermined angle.

As illustrated in FIGS. 11 through 13, a control part 430 is joined with a bottom of a second driving axis 420. The control part 430 includes a control box 432 being formed in a cylindrical shape, an elastic member 434 being located between an inside of the control box 432 and the second driving axis 420, and a protrusion 424 being formed on an outer surface of the second driving axis 420. A coil spring may be used as the elastic member 434. The control part 430 may control rotation of the second driving axis 420. Specifically, a first valve 310 and a second valve 410 interfere with each other when the first and second valves 310 and 410 are rotated to couple/decouple the first pipe 100 and the second pipe 200. To avoid the interference, before the first valve 310, the second driving axis 420 is rotated, and the second valve 410 is receded by a predetermined angle in a counterclockwise direction, which is illustrated in FIG. 13. In this instance, the elastic member 434 stores a compression force by the rotating protrusion 424. After the first valve 310 is rotated, the second valve 410 rotates by a predetermined angle α in a clockwise direction by the compression force of the elastic member 434, and is back to the original state. In the embodiment of the present invention, the control part is configured using the elastic member, however the control part may be configured using a motor or a machine apparatus.

As described above, a working time may be reduced since pipes are replaced or repaired without leakage of a fluid in the pipes to an outside. Also, air pollution and a disastrous accident may be prevented since flow channels of the pipes are securely closed using spherical shaped valves, and the fluid is not leaked to an outside when coupling/decoupling the pipes.

According to the above-described exemplary embodiments of the present invention, it is possible to reduce a working time since flow channels are selectively closed by coupling a valve with ends of pipes, and it is possible to decouple the pipes from each other without eliminating a fluid in the pipes.

Also, according to the above-described exemplary embodiments of the present invention, it is possible to improve safety of a worker since flow channels are securely closed using a valve structure corresponding to a shape of pipes, and a fluid in the pipes is not leaked to an outside, and it is possible to prevent air pollution and waste of resources.

Also, according to the above-described exemplary embodiments of the present invention, it is possible to provide simple maintenance and repairing using a simple valve structure, and it is possible to use pipes on a semi-permanent basis.

Also, according to the above-described exemplary embodiments of the present invention, it is possible to prevent fuels from leaking out when pipes are coupled with each other or decoupled from each other when transferring from a huge vessel or from a huge storage base to another place.

Also, according to the above-described exemplary embodiments of the present invention, it is possible to easily perform coupling/decoupling of pipes without eliminating a refrigerant in an apparatus such as an air conditioner or a refrigerator.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A coupling/decoupling assembly of a pipe, comprising:
a first pipe with a first flow channel;
a second pipe being capable of being coupled/decoupled with the first pipe, and with a second flow channel which is connected to the first flow channel so that a fluid flows therethrough;
a first valve unit being joined with the first pipe to selectively open/close the first channel; and
a second valve unit being joined with the second pipe to selectively open/close the second channel,
wherein each of the first and second valve units respectively opens each of the first and second flow channels when the first and second pipes are coupled with each other, and each of the first and second valve units respectively closes the first and second flow channels when the first and second pipes are decoupled from each other; and
wherein the first valve unit comprises a first valve being a part of a spherical body whose outer surface is being configured in a first radius of a curvature, a first driving axis being joined with the first valve to rotate toward a center of the spherical body, and
wherein the second valve unit comprises a second valve being a part of a spherical body, and having a second radius of a curvature, the second radius of the curvature being greater than the first radius of the curvature; and a second driving axis being joined with the second valve to rotate based on the center of the spherical body with the second radius of the curvature.

2. The coupling/decoupling assembly of the pipe of claim 1, wherein an inner surface of the first valve is recessed.

3. The coupling/decoupling assembly of the pipe of claim 1, wherein an inside of an end of the first pipe is formed in a spherical surface in correspondence to the first outer surface, and insides of the first outer surface and the inside of an end of the first pipe make contact with each other.

4. The coupling/decoupling assembly of the pipe of claim 1, wherein an inside of an end of the second pipe is formed in a spherical surface in correspondence to a second outer surface, and insides of the second outer surface and the inside of an end of the second pipe make contact with each other.

5. The coupling/decoupling assembly of the pipe of claim 1, wherein contacted planes of the first pipe, the second pipe, the first outer surface, and the second outer surface are sprayed with a coating agent.

6. A coupling/decoupling assembly of a pipe, comprising:
a first pipe;
a second pipe capable of being coupled/decoupled with the first pipe;
a first valve being joined with the first pipe, and comprising a first outer surface of the first valve having a first radius of a curvature;
a second valve being joined with the second pipe, and comprising a second outer surface of the second valve having a second radius of a curvature, the second radius of the curvature being greater than the first radius of the curvature;
a first driving axis joined normal to the first outer surface of the first valve; and
a second driving axis joined normal to the second outer surface of the second valve;
wherein, when the first and second pipes are coupled with each other, the first and second valves rotate to be fixed away from a flow channel of a fluid so that the first and second valves do not prevent the fluid from flowing, and, when the first and second pipes are decoupled from each other, the first and second valves rotate to be fixed, respectively closing the first and second pipes, and preventing leakage of the fluid.

7. The coupling/decoupling assembly of the pipe of claim 6, wherein an inner surface of the first valve is recessed so as to have the second radius of the curvature.

8. The coupling/decoupling assembly of the pipe of claim 6, wherein an inner surface of the second valve is recessed.

9. The coupling/decoupling assembly of the pipe of claim 6, wherein an inside of an end of the first pipe is expanded in a spherical body shape, which has the first radius of the curvature, and forms a first expansion part.

10. The coupling/decoupling assembly of the pipe of claim 6, wherein an inside of an end of the second pipe is formed in a spherical body shape, which has the second radius of the curvature, and forms a second expansion part.

11. The coupling/decoupling assembly of the pipe of claim 10, wherein a protrusion is formed on a side of the second expansion part.

12. The coupling/decoupling assembly of the pipe of claim 11, wherein a portion of the protrusion of the second expansion part is formed in the spherical body, which has the first radius of the curvature, the first radius of the curvature being formed along a surface where the first valve has passed through while rotating.

13. The coupling/decoupling assembly of the pipe of claim 11, wherein an end side of the second valve is protruded to form a connection part, the connection part being expanded along the second expansion part, and the connection part is joined with the second driving axis.

14. The coupling/decoupling assembly of the pipe of claim 6, wherein the first valve rotates to 90 degrees, based on the first driving axis, to open/close the first pipe.

15. The coupling/decoupling assembly of the pipe of claim 6, wherein the second valve rotates to 90 degrees, based on the second driving axis, to open/close the second pipe.

16. The coupling/decoupling assembly of the pipe of claim 15, wherein the second valve is receded by a predetermined angle to avoid interfering with the first valve.

17. The coupling/decoupling assembly of the pipe of claim 15, wherein contacted planes of a first expansion portion, a second expansion portion, the first outer surface, and the second outer surface are sprayed with a coating agent.

18. A coupling/decoupling assembly of a pipe, comprising:
a first pipe having a first contact part, and an end of the first pipe having a first radius of a curvature, the first radius of the curvature being greater than an inside diameter of the first pipe;
a second pipe having a second contact part, and an end of the second pipe having a second radius of a curvature, the second radius of the curvature being greater than the first radius of the curvature;
a first valve being joined with the first pipe, and including a first outer surface and a first inner surface, the first outer surface having the first radius of the curvature, and the first inner surface having the second radius of the curvature and being recessed by the second radius of the curvature;
a second valve being joined with the second pipe, including a second outer surface and a second inner surface, the second outer surface having the second radius of the curvature, and the second inner surface being recessed;

a first driving axis being joined with the first valve to rotate normal to the first outer surface; and a second driving axis being joined with the second valve to rotate normal to the first outer surface of the second pipe, and having a control part which provides the second valve with inverse rotation, wherein, when the first and second pipes are joined with each other, the first and second valves rotate to be fixed away from a flow channel of a fluid so that the first and second valves do not prevent the fluid from flowing, and, when the first and second pipes are decoupled from each other, the first valve and second valves rotate to be fixed, respectively closing the first and second pipe, and preventing leakage of the fluid.

19. The coupling/decoupling assembly of the pipe of claim 18, wherein the control part comprises:

a protrusion being formed on an outer surface of the second driving axis;

a control box encircling a portion of the second driving axis, and having the protrusion;

an elastic member being embedded in the control box, and providing a restoration force based on a rotating direction of the second driving axis.

20. The coupling/decoupling assembly of the pipe of claim 19, wherein the protrusion is formed on a side of the second contact part.

21. The coupling/decoupling assembly of the pipe of claim 20, wherein a portion of the protrusion of the second contact part is formed in the spherical body with the first radius of the curvature, the first radius of the curvature being formed along a surface where the first valve has passed through while rotating.

22. The coupling/decoupling assembly of the pipe of claim 18, wherein an end side of the second valve is protruded to form a connection part along the second contact part, and the connection part is joined with the second driving axis.

23. The coupling/decoupling assembly of the pipe of claim 18, wherein the first valve rotates to 90 degrees, based on the first driving axis, to open/close the first pipe.

24. The coupling/decoupling assembly of the pipe of claim 18, wherein the second valve rotates to 90 degrees, based on the second driving axis, to open/close the second pipe.

25. The coupling/decoupling assembly of the pipe of claim 24, wherein the second valve is receded by a predetermined angle to avoid interference of the first valve.

26. The coupling/decoupling assembly of the pipe of claim 18, wherein the first contact portion, the second contact portion, a portion of the first outer surface, and a portion of the second outer surface are sprayed with a coating agent.

* * * * *